(12) United States Patent
Inoue

(10) Patent No.: US 10,234,877 B2
(45) Date of Patent: Mar. 19, 2019

(54) POSITIONER

(71) Applicant: Azbil Corporation, Tokyo (JP)

(72) Inventor: Kazuhisa Inoue, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 421 days.

(21) Appl. No.: 15/072,505

(22) Filed: Mar. 17, 2016

(65) Prior Publication Data

US 2016/0274593 A1   Sep. 22, 2016

(30) Foreign Application Priority Data

Mar. 17, 2015   (JP) .................................. 2015-053902

(51) Int. Cl.
| | |
|---|---|
| *G05D 7/06* | (2006.01) |
| *F15B 5/00* | (2006.01) |
| *F15B 19/00* | (2006.01) |
| *F16K 37/00* | (2006.01) |

(52) U.S. Cl.
CPC ........... *G05D 7/0629* (2013.01); *F15B 5/006* (2013.01); *F15B 19/002* (2013.01); *F16K 37/0083* (2013.01); *F15B 2211/6343* (2013.01); *G05B 2219/41246* (2013.01)

(58) Field of Classification Search
CPC .................................................. G05D 7/0629
See application file for complete search history.

(56) References Cited

U.S. PATENT DOCUMENTS

2015/0088434 A1* 3/2015 Grabau ............... G01M 99/008
   702/34

FOREIGN PATENT DOCUMENTS

| JP | S62-28118 A | 2/1987 |
|---|---|---|
| JP | 3511458 B2 | 3/2004 |

* cited by examiner

*Primary Examiner* — Tejal Gami
(74) *Attorney, Agent, or Firm* — Oblon, McClelland, Maier & Neustadt, L.L.P.

(57) ABSTRACT

A first table defines the relationship between the sliding resistance index μk of a packing gland and the ambient temperature for each type of the packing gland is provided. A second table defines control parameters corresponding to hysteresis levels for each size of the setting/operating device is provided. By repeating, at regular intervals, the acquisition of the sliding resistance index μk at present corresponding to the ambient temperature at present and the type of a packing gland from the first table and the selection of the control parameter corresponding to the size of the setting/operating device and the hysteresis level obtained from the sliding resistance index μk at present from the second table, the valve opening of the regulating valve is controlled using the selected control parameter.

7 Claims, 7 Drawing Sheets

FIG. 3

| | FORM | STRUCTURAL MATERIAL | APPLICATION FLUID |
|---|---|---|---|
| ULTRA HIGH TEMPERATURE APPLICATION OVER 500 DEGREES | P6610CH+M8590 | EXPANSION GRAPHITE MOLDED PACKING + CARBON-FIBER REINFORCED EXPANSION GRAPHITE PACKING (ADAPTER) | HIGH TEMPERATURE AND HIGH PRESSURE APPLICATION (STRONG ACID OR STRONG ALKALINE TOXIC GAS NOT APPLICABLE) |
| | T2200+ P6710CH(TYPE2) | EXPANSION GRAPHITE MOLDED PACKING + METAL-WIRE REINFORCED EXPANSION GRAPHITE BRAIDED PACKING (ADAPTER) | HIGH TEMPERATURE AND HIGH PRESSURE APPLICATION (STRONG ACID OR ALKALINE TOXIC GAS NOT APPLICABLE) |
| HIGH TEMPERATURE APPLICATION UNDER 500 DEGREES | P6610CH+P8528 | EXPANSION GRAPHITE MOLDED PACKING + CARBON FIBER BRAIDED PACKING (ADAPTER) | HIGH TEMPERATURE AND HIGH PRESSURE APPLICATION (STRONG ACID OR STRONG ALKALINE TOXIC GAS NOT APPLICABLE) |
| | GRAPHITE YARN (P6610L+P6722) | EXPANSION GRAPHITE MOLDED PACKING + ALAMIDO-FIBER REINFORCED EXPANSION GRAPHITE BRAIDED PACKING (ADAPTER) | HIGH TEMPERATURE AND HIGH PRESSURE APPLICATION (STRONG OR STRONG ALKALINE TOXIC GAS NOT APPLICABLE) |
| ROOM TEMPERATURE AND LOW TEMPERATURE APPLICATION | PTFE | PURE PTFE MOLDED PACKING | GENERAL APPLICATION (VARIOUS CHEMICAL AGENTS, ACID, ALKALI) OIL PROHIBITED |
| | PTFE YARN | PTFE FIBER BRAIDED PACKING INCLUDING GRAPHITE FIBER CORE | GENERAL APPLICATION (VARIOUS CHEMICAL AGENTS, ACID, ALKALI) |
| | PTFE+Y7233 | PURE PTFE MOLDED PACKING + PTFE FIBER STRING BRAIDED PACKING | GENERAL APPLICATION (VARIOUS CHEMICAL AGENTS, ACID, ALKALI) OIL PROHIBITED |
| | PTFE+TK2006 | PURE PTFE MOLDED PACKING + PTFE STRING BRAIDED PACKING | GENERAL APPLICATION (VARIOUS CHEMICAL AGENTS, ACID, ALKALI) LNG, HE GAS |

FIG. 4

| PACKING TYPE | VALUE |
|---|---|
| LOW TORQUE COMBINED GRASEAL PACKING | 0.03 ~ 0.04 |
| COMBINED GRASEAL PACKING | 0.05 ~ 0.07 |
| SUPER SEALPACKING | 0.03 ~ 0.04 |

POSITIONER

CROSS REFERENCE TO RELATED APPLICATION

This application claims priority to Japanese Patent Application No. 2015-053902 filed Mar. 17, 2015. This application is incorporated herein by reference in its entirety.

FIELD OF THE INVENTION

The present invention relates to a positioner controlling the opening of a regulating valve.

BACKGROUND

A conventional positioner is attached to a regulating valve provided in a pipe through which fluid flows so as to control the opening of the regulating valve.

This positioner includes a controlling portion obtaining the difference between a valve opening setting value sent from a higher-level device and an actual opening value fed back from the regulating valve and outputting, as a control output, an electric signal obtained by applying a predetermined calculation to the difference, an electric-pneumatic converter converting the control output from the controlling portion to an air pressure signal, and a pilot relay amplifying the air pressure signal converted by the electric-pneumatic converter and outputting the amplified signal to the setting/operating device of the regulating valve (see Japanese Unexamined Patent Application Publication S62-28118, for example).

FIG. 5 illustrates the structure of the main part of a conventional positioner. In this drawing, reference numeral 1 indicates a positioner, reference numeral 2 indicates a regulating valve, and the regulating valve 2 is provided with an opening sensor 3 detecting the opening (valve opening) of the regulating valve. The positioner 1 includes a controlling portion 11, an electric-pneumatic converter (EPM) 12, and a pilot relay 13. The valve opening of the regulating valve 2 detected by the opening sensor 3 is fed back to the controlling portion 11 as an actual opening value $\theta pv$.

In the positioner 1, the controlling portion 11 obtains the difference between a valve opening setting value $\theta sp$ from a higher-level device (not illustrated) and the actual opening value $\theta pv$ from the opening sensor 3 and outputs an electric signal obtained by applying PID control calculation to this difference as a control output MV.

The electric-pneumatic converter 12 converts the control output MV from the controlling portion 11 to an air pressure signal (nozzle back pressure) Pn. The pilot relay 13 amplifies the air pressure signal Pn from the electric-pneumatic converter 12 and outputs the amplified signal to a setting/operating device 2a of the regulating valve 2 as an air pressure Po. This causes air with the air pressure Po to flow into the diaphragm chamber of the setting/operating device 2a to adjust the opening of a valve 2b of the regulating valve 2.

In the positioner 1, the electric-pneumatic converter 12 and the pilot relay 13 constitute an electric-pneumatic converting portion 14 converting the control output MV from the controlling portion 11 to the air pressure (output air pressure) Po for the regulating valve 2. In addition, a supply air pressure (instrumentation air) Ps from the outside is supplied to the electric-pneumatic converter 12 and the pilot relay 13.

FIG. 6 illustrates the main part of the regulating valve 2. The regulating valve 2 is provided with a valve stem 2d moving up and down by the air pressure Po from the positioner 1 supplied to a diaphragm chamber 2c in the setting/operating device 2a and a packing gland 2f is provided between the outer peripheral surface of the valve stem 2d and the inner peripheral surface of a stem insertion hole 2e as illustrated in FIG. 6. The packing gland 2f includes a plurality of ring-shaped packings provided in close contact with each other in the shaft direction of the valve stem 2d so as to prevent fluid from leaking from the gap.

In the positioner 1, it is necessary to set appropriate control parameters matching the characteristics of the regulating valve 2 for the controlling portion 11 to properly control the opening of the regulating valve 2. For this purpose, before actually controlling the opening of the regulating valve 2 after newly installing (or replacing) the regulating valve 2 in the field or during execution of periodic maintenance, the control parameters used for the controlling portion 11 are tuned. The tuning of the control parameters is performed automatically during automatic setup or the like (see Japanese Patent No. 3511458, for example).

In this case, when receiving an automatic tuning instruction, the controlling portion 11 actually drives the regulating valve 2 and obtains, as the operation time, the response time when the valve opening of the regulating valve 2 continuously shifts from, for example, the 10% position to the 90% position and, based on the obtained operation time, determines the size of the setting/operating device 2a with reference to the setting/operating device size/operation time table defining the correspondence between the size of the setting/operating device and the operation time (step S101 illustrated in FIG. 7).

Then, the controlling portion 11 obtains, as the friction, the sliding resistance (stem motion resistance) of the valve stem 2d of the regulating valve 2 based on a step response from, for example, the 40% position to the 60% position of the valve opening position of the regulating valve 2 (step S102) and determines the hysteresis level (H/M/L) based on the obtained friction with reference to a hysteresis level (HYS)/friction table (step S103).

Then, the controlling portion 11 selects the corresponding control parameter with reference to a control parameter table defining the correspondence among the size of the setting/operating device, the hysteresis level, and the control parameters based on the size of the setting/operating device determined in step S101 and the hysteresis level determined in step S103 (step S104) and sets the selected control parameter as an appropriate control parameter used to control the opening of the regulating valve 2 (step S105).

SUMMARY

However, in the conventional positioner, even when an appropriate control parameter is set according to the size of a setting/operating device and the hysteresis level using automatic tuning, since the sliding resistance (friction) of the valve stem of the regulating valve changes as the ambient temperature of the regulating valve changes, the control parameter deviates from the optimum value, overshooting, hunting, and fluctuation of the valve opening are caused, and fluid control may become unstable.

In the case of the regulating valve 2 illustrated in FIG. 6, changes in the sliding resistance (friction) of the valve stem 2d of the regulating valve 2 are caused mainly by changes in the shapes of the packing gland 2f and the valve stem 2d due to the linear expansion coefficients. For example, even when the control parameter is set to the optimum value by performing the automatic tuning of the control parameter at an ambient temperature of 20 degrees centigrade, if the ambient temperature changes from −40 to 80 degrees centigrade defined by general product specifications, the amount of variation in the ambient temperature of the packing gland 2f is 60 degrees centigrade on the plus and minus sides. Accordingly, the shapes of the packing gland 2f and the valve stem 2d change due to the linear expansion coefficients and the sliding resistance (friction) of the valve stem 2d of the regulating valve 2 changes. Accordingly, the control parameter deviates from the optimum value and overshooting, hunting, and fluctuation of the valve opening are caused, thereby making fluid control unstable.

When the temperature of fluid is high or low, an extension bonnet 2g is often provided between the setting/operating device 2a and the valve 2b and the packing gland and the stem portion (portion A) are structurally separated from a valve portion (portion B) to form a temperature gradient, and a cold insulating plate (heat conserving plate) 2h is disposed to minimize the effect of fluid temperature. Accordingly, the temperatures of most packing glands and the stem portion (portion A) are almost the same as the ambient temperature. That is, only the ambient temperature of the regulating valve 2 needs to be considered. When the ambient temperature is different from that in the previous tuning, the turning only needs to be performed again. However, in a field where daily temperature variation is large, it is difficult to constantly tune the control parameter to an appropriate value.

The invention addresses the above problems with an object of providing a positioner achieving stable fluid control by suppressing occurrence of overshooting, hunting, and fluctuation of the valve opening even when the ambient temperature changes significantly.

To achieve this object, according to the invention, there is provided a positioner including a controlling portion outputting, as a control output, an electric signal according to a difference between a valve opening setting value sent from a higher-level device and an actual opening value fed back from a regulating valve and an electric-pneumatic converting portion converting the control output from the controlling portion to an air pressure and outputting the air pressure to a setting/operating device of the regulating valve, the positioner including a characteristic value/ambient temperature relationship storing portion storing a relationship between a characteristic value indicating sliding performance of a valve stem of the regulating valve, the sliding performance changing depending on an ambient temperature, and the ambient temperature, a control parameter storing portion storing correspondence between a level of the characteristic value and a control parameter used to control a valve opening of the regulating valve, a temperature sensor measuring the ambient temperature at present of the regulating valve, a current characteristic value acquisition portion acquiring, as the characteristic value at present, the characteristic value corresponding to the ambient temperature at present of the regulating valve measured by the temperature sensor based on the relationship stored in the characteristic value/ambient temperature relationship storing portion, and a control parameter selecting portion selecting, from the control parameter storing portion, the control parameter corresponding to the level of the characteristic value at present acquired by the characteristic value acquisition portion, in which the controlling portion causes the characteristic value acquisition portion to acquire the characteristic value at present and the control parameter selecting portion to select the control parameter corresponding to the level of the characteristic value at present repeatedly at regular intervals and the controlling portion controls the valve opening of the regulating valve using the selected control parameter.

According to examples of the invention, the ambient temperature at present of the regulating valve is measured by the temperature sensor and the characteristic value corresponding to the ambient temperature at present of the regulating valve measured by the temperature sensor is acquired as the characteristic value at present from the relationship stored in the characteristic value/ambient temperature relationship storing portion. For example, in the invention, when the characteristic value indicating the sliding performance of the valve stem of the regulating valve that changes depending on the ambient temperature is assumed to be $\mu k$ ($\mu k = \mu^* k$), which is the product of the friction coefficient $\mu$ and the lateral pressure coefficient k, then sliding resistance index $\mu k$ of the gland packing is acquired as the characteristic value at present. Then, the control parameter corresponding to the level (for example, the hysteresis level, obtained from the sliding resistance index $\mu k$ of the packing gland, to which the friction belongs) of the acquired characteristic value at present is selected from the control parameter storing portion.

In the invention, the controlling portion repeats the acquisition of the characteristic value at present and the selection of the control parameter corresponding to the level of the acquired characteristic value at present at regular intervals and controls the valve opening of the regulating valve using the selected control parameter. Accordingly, an appropriate control parameter matching the ambient temperature at present of the regulating valve is always used and stable fluid control is achieved.

Although the ambient temperature at present of the regulating valve is measured by the temperature sensor in the invention, the ambient temperature at present of the regulating valve measured by the temperature sensor may be the temperature inside the cabinet of the positioner or may be the outside air temperature. In addition, the characteristic value/ambient temperature relationship storing portion may store the relationship between the characteristic value indicating the sliding performance of the valve stem of the regulating valve, the sliding performance changing depending on the ambient temperature, and the ambient temperature as a table or expression. In addition, the characteristic value/ambient temperature relationship storing portion may store, for each type of packing glands used for the regulating valve, the relationship between the sliding resistance index $\mu k$ of the packing gland and the ambient temperature as the characteristic value indicating the sliding performance of the valve stem of the regulating valve and the control parameter storing portion may store, for each size of setting/operating devices used for the regulating valve, the correspondence between the level of the characteristic value and the control parameter used to control the opening of the regulating valve.

According to examples of the invention, since the acquisition of the characteristic value (characteristic value at present) indicating the sliding performance of the valve stem of the regulating valve corresponding to the ambient temperature at present of the regulating valve and the selection of the control parameter corresponding to the level of the characteristic value at present are repeated at regular intervals and the valve opening of the regulating valve is controlled using the selected control parameter, by constantly using an appropriate control parameter matching the ambient temperature at present of the regulating valve, the occurrence of overshooting, hunting, and fluctuation of the valve opening is suppressed even when the ambient temperature significantly changes, thereby achieving stable fluid control.

BRIEF DESCRIPTION OF THE DRAWINGS

FIG. 3 illustrates the classification of packing glands used in a regulating valve.

FIG. 4 illustrates the sliding resistance index μk that depends on the types of packings.

DETAILED DESCRIPTION

An example of the invention will be described in detail below with reference to the drawings.

Figure 1:
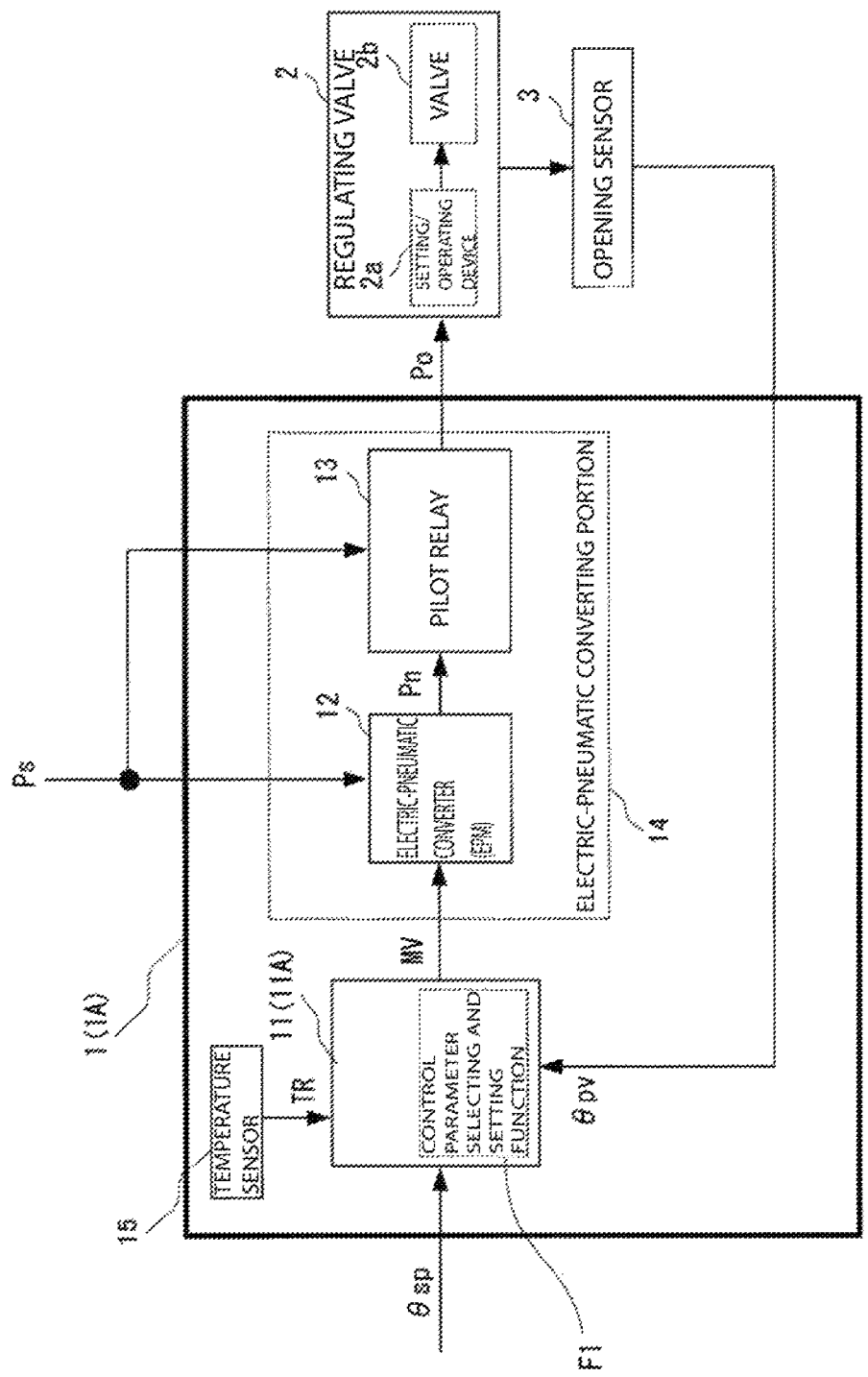
FIG. 1 illustrates the main part of a positioner according to an example of the invention.

FIG. 1 illustrates the main part of a positioner according to the example of the invention. In this drawing, the same reference numerals as in FIG. 5 indicate the same or similar components described with reference to FIG. 5 and descriptions are omitted.

In the positioner 1 according to the example, a temperature sensor 15 is provided in the cabinet of the positioner 1 and the temperature inside the cabinet of the positioner 1 measured by the temperature sensor 15 is given to a controlling portion 11 as an ambient temperature TR of the regulating valve 2.

In the positioner 1, the controlling portion 11 has a control parameter selecting and setting function F1 for selecting and setting the optimum control parameter used to control the valve opening of the regulating valve 2 as a function specific to the example at regular intervals.

Figure 5:
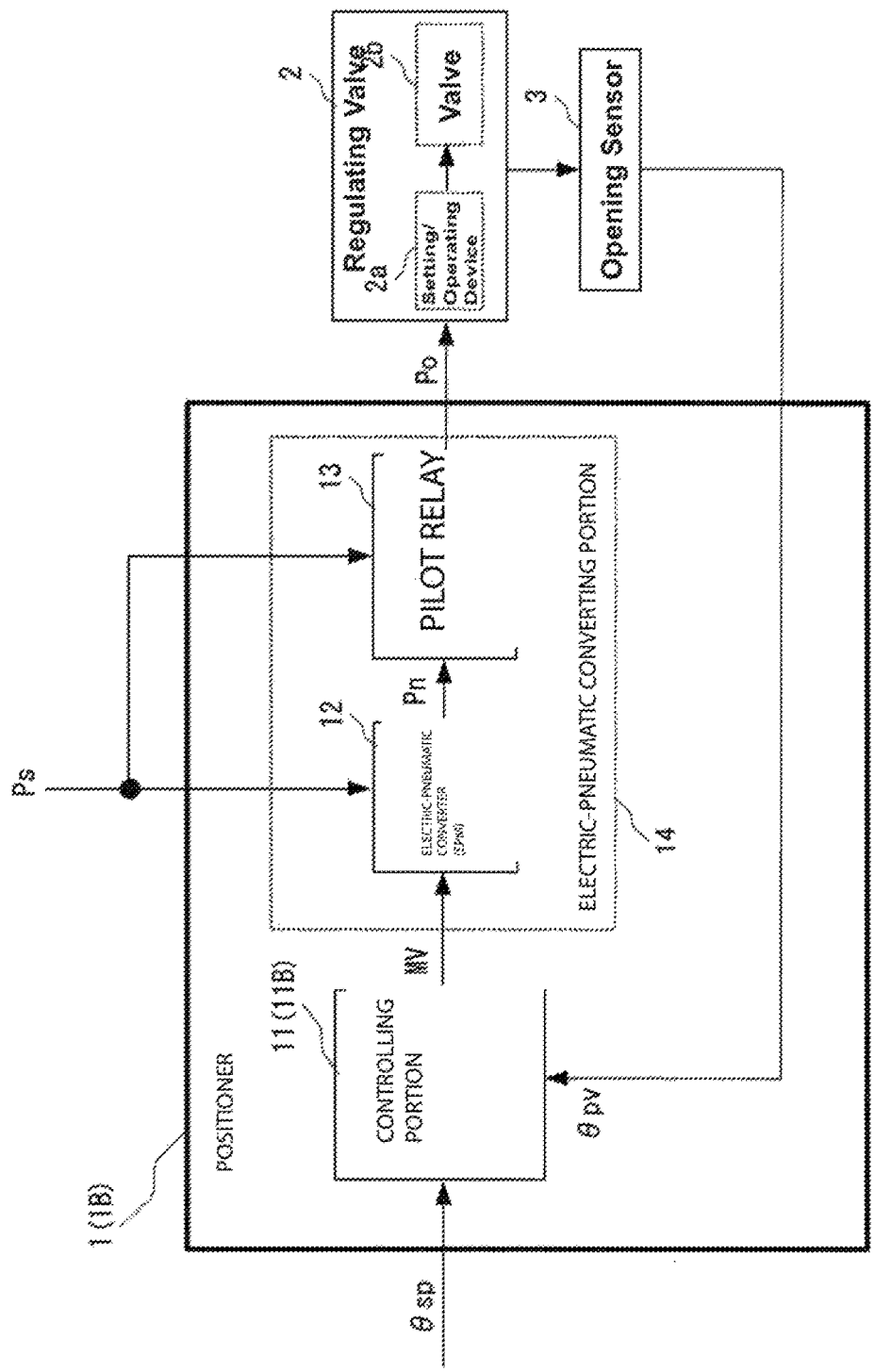
FIG. 5 illustrates the structure of the main part of a conventional positioner.
Figure 6:
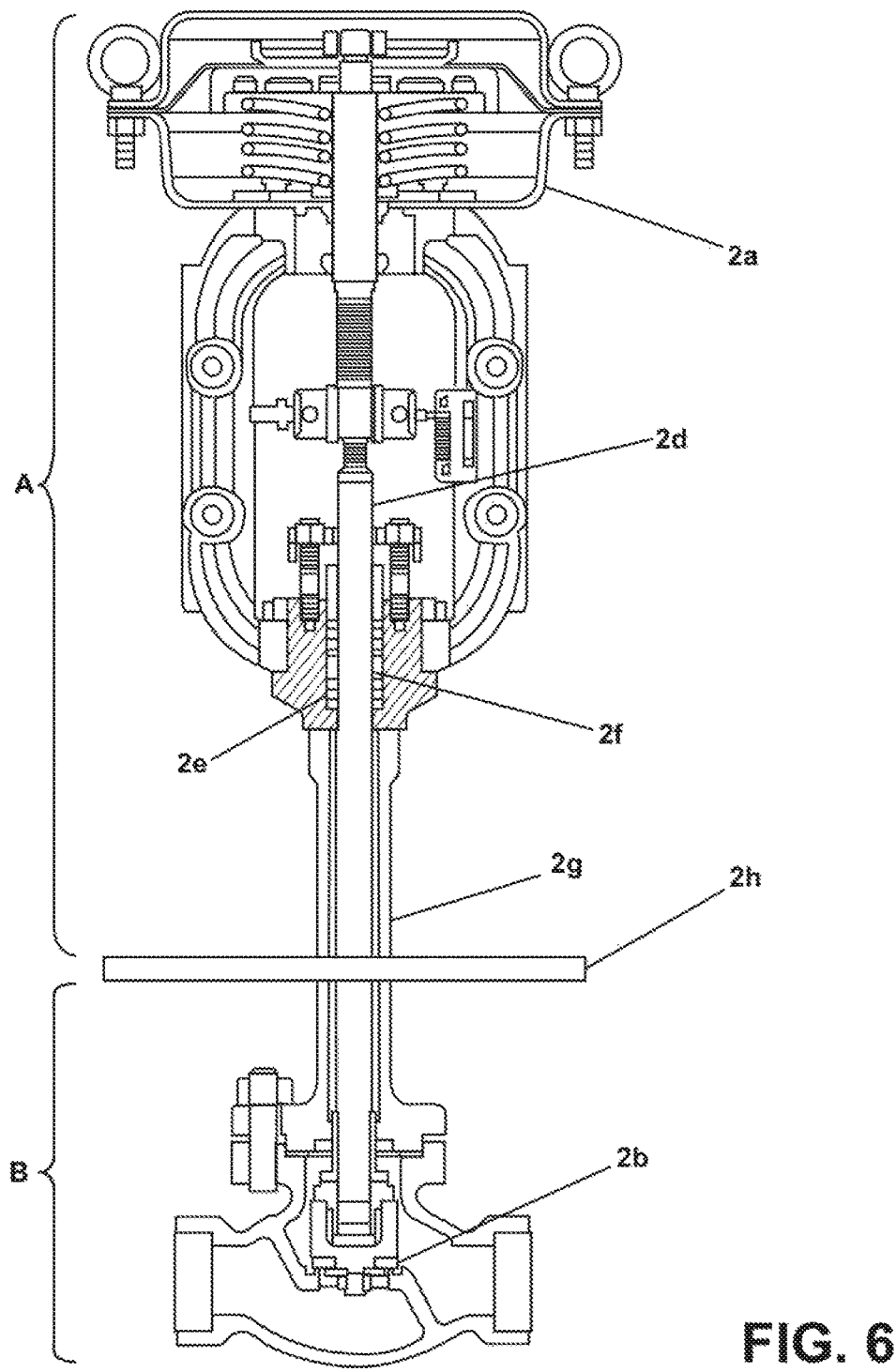
FIG. 6 illustrates the structure of the main part of the regulating valve.
Figure 7:
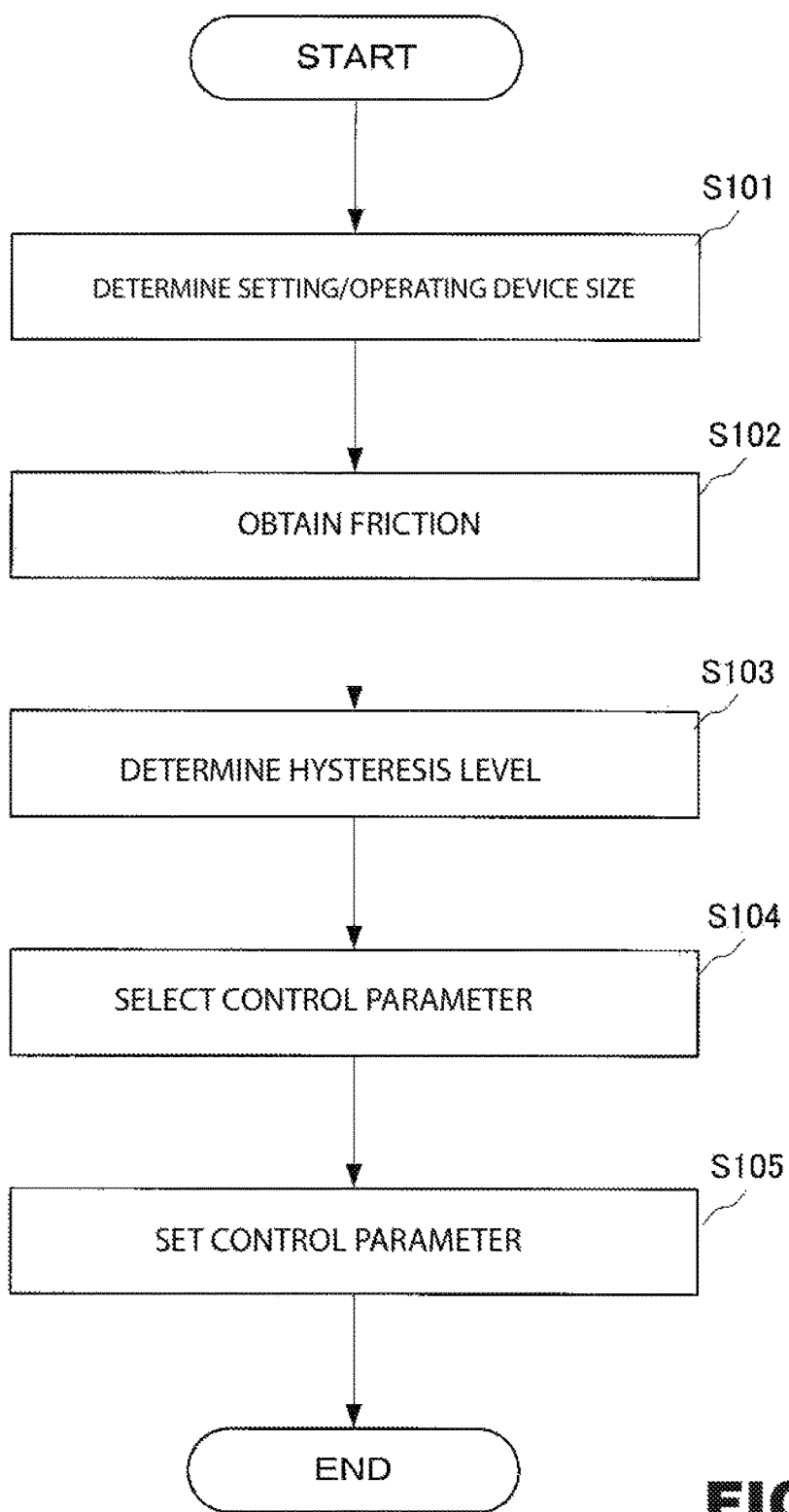
FIG. 7 is a flowchart illustrating automatic tuning in a conventional positioner.

The positioner 1 in the example is denoted below as 1A to distinguish it from the conventional positioner 1 (1B) illustrated in FIG. 5. In addition, the controlling portion 11 in the example is denoted as 11A to distinguish it from the controlling portion 11 (11B) in the conventional positioner 1B illustrated in FIG. 5. The controlling portion 11A is configured by hardware including a processor and memory device and a program achieving various types of functions in corporation with the hardware.

Figure 2:
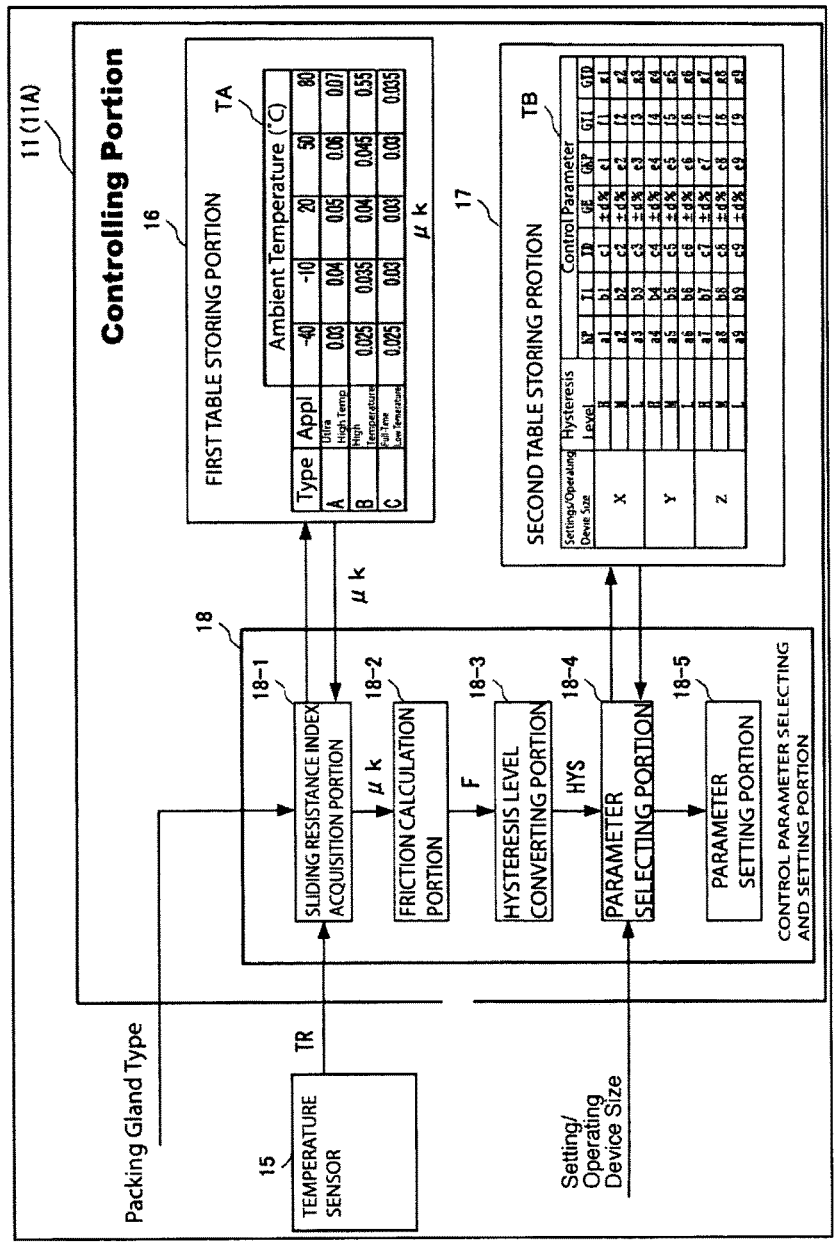
FIG. 2 is a functional block diagram illustrating the main part of a controlling portion of the positioner.

FIG. 2 is a functional block diagram illustrating the main part of the controlling portion 11A. The controlling portion 11A includes a first table storing portion 16, a second table storing portion 17, and a control parameter selecting and setting portion 18 to achieve the control parameter selecting and setting function F1.

The first table storing portion 16 stores a first table TA that defines the relationship between the sliding resistance indexes μk of packing glands and the ambient temperature for each type of the packing glands by assuming that the characteristic value in the invention indicating the sliding performance of the valve stem of the regulating valve that changes depending on the ambient temperature to be the sliding resistance index μk (μk=μ*k, μ: friction coefficient, k: lateral pressure coefficient) of each of the packing glands.

The packing glands used for the regulating valve 2 are classified by application purposes (ultra high temperature application, high temperature application, and full-time low temperature application) as illustrated in FIG. 3. Many types of packing glands having different forms, structural materials, and application fluids are present and each type has a different sliding resistance index μk (see FIG. 4).

In the example, based on experiment and calculation, the relationship between the sliding resistance indexes μk and the ambient temperatures for typical packing glands is obtained for each type of the packing glands (type A (ultra high temperature), type B (high temperature), and type C (full-time low temperature)) and the obtained relationship is stored as the first table (sliding resistance index table) TA in the first table storing portion 16. The relationship between the sliding resistance indexes μk and the ambient temperatures of the packing glands may be stored as a temperature characteristic expression.

The second table storing portion 17 stores the second table (control parameter table) TB defining the correspondence between the hysteresis levels (HYS) and the control parameters (KP, TI, TD, GE, GKP, GTI, and GTD) for each size of a setting/operating device used in the regulating valve 2 by assuming that the level of the characteristic value in the invention indicating the sliding performance of the valve stem of the regulating valve to be the hysteresis level (HYS). In the example, the hysteresis level (HYS) is classified into three stages (H, M, and L) and the control parameters corresponding to these three stages of the hysteresis level (HYS) are defined.

The control parameter selecting and setting portion 18 includes a sliding resistance index acquisition portion 18-1, a friction calculation portion 18-2, a hysteresis level converting portion 18-3, a parameter selecting portion 18-4, and a parameter setting portion 18-5. The functions of the individual portions of the control parameter selecting and setting portion 18 will be described below together with their operation.

The operator sets the types of the packing glands used in the regulating valve 2 for the positioner 1A during the initial setting or the replacement of the packing gland. The types of the packing gland set for the positioner 1A are given to the sliding resistance index acquisition portion 18-1. In addition, the ambient temperature TR at present of the regulating valve 2 measured by the temperature sensor 15 is also given to the sliding resistance index acquisition portion 18-1.

The sliding resistance index acquisition portion 18-1 receives the type of the packing gland used in the regulating valve 2 and the ambient temperature TR at present of the regulating valve 2 and acquires, as the sliding resistance index μk at present, the sliding resistance index μk corresponding to the input type of the packing gland used in the regulating valve 2 and the input ambient temperature TR at present of the regulating valve 2, from the first table TA. The sliding resistance index μk at present acquired by the sliding resistance index acquisition portion 18-1 is sent to the friction calculation portion 18-2.

The friction calculation portion 18-2 obtains the stem motion resistance F as the sliding resistance (friction) of the valve stem 2d of the regulating valve 2 by substituting the sliding resistance index μk at present from the sliding resistance index acquisition portion 18-1 into an expression (1) below. A friction F obtained by the friction calculation portion 18-2 is sent to the hysteresis level converting portion 18-3.

$$F = \mu^* k^* \pi^* D^* H^* P \text{ (N)} \tag{1}$$

where D is the diameter (mm) of the valve stem, H is the height (mm) of the packing gland=, P is the fastening surface pressure (N/mm$^2$) of the packing gland, and μk equals μ*k.

Since the setting/operating device 2a is a direct acting type setting/operating device in this example, the stem motion resistance F is obtained as the sliding resistance (friction) of the valve stem 2d of the regulating valve 2. When the setting/operating device 2a is a rotary type setting/operating device, the stem rotary torque T is obtained as the sliding resistance (friction) of the valve stem 2d of the regulating valve 2 based on an expression (2) below.

$$T=(F*D/2)*0.001 \text{ (Nm)} \quad (2)$$

The hysteresis level converting portion 18-3 converts the friction F sent from the friction calculation portion 18-2 to a hysteresis level (HYS) and sends the converted hysteresis level (HYS) to the parameter selecting portion 18-4.

In the example, the hysteresis level (HYS) is classified into three stages (H, M, and L). The hysteresis level (HYS) to which the friction F sent from the friction calculation portion 18-2 belongs is selected and the selected hysteresis level (HYS) is sent from the hysteresis level converting portion 18-3 to the parameter selecting portion 18-4.

The size of the setting/operating device 2a used by the regulating valve 2 is determined during automatic setup. That is, the size of the setting/operating device is determined using the setting/operating device size/operation time table based on the operation time of the setting/operating device 2a. The determined size of the setting/operating device is given to the parameter selecting portion 18-4.

The parameter selecting portion 18-4 receives the size of the setting/operating device used in the regulating valve 2 and the hysteresis level (HYS) sent from the hysteresis level converting portion 18-3 and selects the input control parameter corresponding to the size of setting/operating device and the input hysteresis level (HYS) from a second table TB. The control parameter selected by the parameter selecting portion 18-4 is sent to the parameter setting portion 18-5.

When receiving the control parameter from the parameter selecting portion 18-4, the parameter setting portion 18-5 sets this control parameter sent from the parameter selecting portion 18-4 as a new control parameter for controlling the opening of the regulating valve 2 in place of the control parameter used up to that time.

The control parameter selecting and setting portion 18 repeats a series of operations performed by the sliding resistance index acquisition portion 18-1, the friction calculation portion 18-2, the hysteresis level converting portion 18-3, the parameter selecting portion 18-4, and the parameter setting portion 18-5 at regular intervals.

Accordingly, an appropriate control parameter matching the ambient temperature TR at present of the regulating valve 2 is always used and, even when the ambient temperature changes significantly, occurrence of overshooting, hunting, and fluctuation of the valve opening is suppressed, thereby achieving stable fluid control.

In the structure illustrated in FIG. 2, the first table storing portion 16 corresponds to the characteristic value/ambient temperature relationship storing portion in the invention, the second table storing portion 17 corresponds to the control parameter storing portion, the sliding resistance index acquisition portion 18-1 corresponds to the current characteristic value acquisition portion, and the structure including the friction calculation portion 18-2, the hysteresis level converting portion 18-3, and the parameter selecting portion 18-4 corresponds to the parameter selecting portion.

Although the temperature inside the cabinet of the positioner 1 is measured by the temperature sensor 15 as the ambient temperature TR of the regulating valve 2 in the above example, the ambient temperature TR of the regulating valve 2 may be measured using the temperature sensor 15 provided in the vicinity of the regulating valve 2 or the outside air temperature may be used as the ambient temperature TR of the regulating valve 2.

In addition, when the ambient temperature does not change or changes slightly in the above example, it is possible to reduce software loads only by measuring the temperature using the temperature sensor 15 without acquiring the sliding resistance index μk by the sliding resistance index acquisition portion 18-1 (that is, without selecting the control parameter by the control parameter selecting and setting portion 18). Determination when the ambient temperature does not change or changes slightly depends on an arbitrary setting.

I claim:

1. A positioner, comprising:
   a controller including a processor and configured to output, as a control output, an electric signal according to a difference between a valve opening setting value sent from a higher-level device and an actual opening value fed back from a regulating valve;
   an electric-pneumatic converting portion configured to convert the control output from the controller to an air pressure and outputting the air pressure to a setting/operating device of the regulating valve;
   a characteristic value/ambient temperature relationship non-transitory memory storing a relationship between (1) a sliding resistance index μk as a characteristic value indicating a sliding performance of a valve stem of the regulating valve, the sliding performance changing depending on an ambient temperature, and (2) the ambient temperature;
   a control parameter non-transitory memory storing a correspondence between the characteristic value and a control parameter used to control a valve opening of the regulating valve; and
   a temperature sensor configured to measure a current ambient temperature of the regulating valve,
   wherein the controller is further configured to
   acquire as a current characteristic value, a characteristic value corresponding to the measured current ambient temperature based on the relationship stored in the characteristic value/ambient temperature relationship non-transitory memory,
   select, from the control parameter non-transitory memory, a control parameter corresponding to the current characteristic value,
   acquire the current characteristic value and select the control parameter corresponding to the current characteristic value repeatedly at regular intervals, and
   control the valve opening of the regulating valve using the selected control parameter.

2. The positioner according to claim 1,
   wherein the setting/operating device of the regulating valve is of a direct acting type,
   the characteristic value/ambient temperature relationship non-transitory memory stores, for each type of a packing gland used in the regulating valve, a relationship between the sliding resistance index μk of the packing gland as the characteristic value and the ambient temperature,
   the controller is further configured to acquire, from the relationship stored in the characteristic value/ambient temperature relationship non-transitory memory, the sliding resistance index μk corresponding to the type of the packing gland used in the regulating valve and the current ambient temperature of the regulating valve measured by the temperature sensor as the current characteristic value, and the controller is further configured to substitute the sliding resistance index μk acquired as the current characteristic value into an expression (1) below to obtain a stem motion resistance F as a sliding resistance of the valve stem of the regulating valve, and select a control parameter corresponding to the obtained sliding resistance of the valve stem of the regulating valve from the control parameter non-transitory memory, $$F=\mu*k*\pi*D*H*P \text{ (N)} \quad (1);$$

where μ is a friction coefficient, k is a lateral pressure coefficient, D is a diameter of the valve stem, H is a height of the packing gland, and P is a fastening surface pressure of the packing gland, and μk equals μ*k.

3. The positioner according to claim 1,
wherein the setting/operating device of the regulating valve is of a rotary type, the characteristic value/ambient temperature relationship non-transitory memory stores, for each type of a packing gland used in the regulating valve, a relationship between the sliding resistance index μk of the packing gland as the characteristic value and the ambient temperature, the controller is further configured to acquire, from the relationship stored in the characteristic value/ambient temperature non-transitory memory, the sliding resistance index μk corresponding to the type of the packing gland used in the regulating valve and the current ambient temperature of the regulating valve measured by the temperature sensor as the current characteristic value, and the controller is further configured to substitute the sliding resistance index μk acquired as the current characteristic value into an expression (2) below to obtain a stem motion resistance F, substitute the obtained stem motion resistance F into an expression (3) below to obtain a stem rotary torque T as a sliding resistance of the valve stem of the regulating valve, and select a control parameter corresponding to a level of the obtained sliding resistance of the valve stem of the regulating valve from the control parameter non-transitory memory, $$F=\mu*k*\pi*D*H*P \text{ (N)} \quad (2)$$

$$T=(F*D/2)*0.001 \text{ (Nm)} \quad (3);$$

where μ is a friction coefficient, k is a lateral pressure coefficient, D is a diameter of the valve stem, H is a height of the packing gland, and P is a fastening surface pressure of the packing gland, and μk equals μ*k.

4. The positioner according to claim 1,
wherein the characteristic value/ambient temperature relationship non-transitory memory stores, as a table, a relationship between (1) the characteristic value indicating the sliding performance of the valve stem of the regulating valve, the sliding performance changing depending on the ambient temperature, and (2) the ambient temperature.

5. The positioner according to claim 1,
wherein the characteristic value/ambient temperature relationship non-transitory memory stores, as an expression, a relationship between (1) the characteristic value indicating the sliding performance of the valve stem of the regulating valve, the sliding performance changing depending on the ambient temperature, and (2) the ambient temperature.

6. The positioner according to claim 1,
wherein the control parameter non-transitory memory stores a correspondence between the characteristic value and the control parameter used to control the valve opening of the regulating valve for each size of the setting/operating device used in the regulating valve; and the controller is further configured to select the control parameter corresponding to the current characteristic value and the size of the setting/operating device used in the regulating valve from the control parameter non-transitory memory.

7. A method, comprising:
outputting, as a control output, an electric signal according to a difference between a valve opening setting value sent from a higher-level device and an actual opening value fed back from a regulating valve;

converting the control output to an air pressure and outputting the air pressure to a setting/operating device of the regulating valve;

storing, in a first memory, a relationship between (1) a sliding resistance index μk as a characteristic value indicating a sliding performance of a valve stem of the regulating valve, the sliding performance changing depending on an ambient temperature, and (2) the ambient temperature;

storing in a second memory, a correspondence between the characteristic value and a control parameter used to control a valve opening of the regulating valve;

measuring, using a temperature sensor, the current ambient temperature of the regulating valve;

acquiring, as a current characteristic value, a characteristic value corresponding to the measured ambient temperature based on the relationship stored in the second memory, selecting, from the second memory, a control parameter corresponding to the current characteristic value;

acquiring the current characteristic value and selecting the control parameter corresponding to the current characteristic value repeatedly at regular intervals; and controlling the valve opening of the regulating valve using the selected control parameter.

* * * * *